United States Patent
Blackwell et al.

(10) Patent No.: US 6,487,879 B1
(45) Date of Patent: Dec. 3, 2002

(54) METHOD OF MAKING TITANIA-DOPED FUSED SILICA

(75) Inventors: Jeffrey L. Blackwell, Corning, NY (US); David Dasher, Corning, NY (US); A. Renee Sutton, Corning, NY (US); Carlton M. Truesdale, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/380,554

(22) PCT Filed: Feb. 25, 1998

(86) PCT No.: PCT/US98/03656

§ 371 (c)(1),
(2), (4) Date: Dec. 13, 1999

(87) PCT Pub. No.: WO98/39496

PCT Pub. Date: Sep. 11, 1998

Related U.S. Application Data

(60) Provisional application No. 60/040,048, filed on Mar. 7, 1997.

(51) Int. Cl.[7] ............................................. C03B 37/018
(52) U.S. Cl. ............................ 65/414; 65/413; 65/421; 65/423; 65/435; 65/60.52
(58) Field of Search ....................... 65/414, 413, 423, 65/421, 60.52, 435

(56) References Cited

U.S. PATENT DOCUMENTS

| | | | |
|---|---|---|---|
| 2,239,551 A | 4/1941 | Dalton et al. ................ | 49/79 |
| 2,272,342 A | 8/1942 | Hyde ........................... | 49/78.1 |
| 2,326,059 A | 8/1943 | Nordberg ..................... | 106/52 |
| 3,933,162 A | 1/1976 | Smith .......................... | 133/1 |
| 4,501,602 A | 2/1985 | Miller et al. ................ | 65/18.2 |
| 4,617,408 A | * 10/1986 | Nestler et al. ............... | 556/40 |
| 4,768,859 A | 9/1988 | Kasori et al. ............. | 350/96.34 |
| 4,877,306 A | 10/1989 | Kar ......................... | 350/96.33 |
| 4,915,988 A | 4/1990 | Erbil .......................... | 427/252 |
| 5,043,002 A | 8/1991 | Dobbins et al. ............. | 65/3.12 |
| 5,067,975 A | 11/1991 | Backer et al. ............... | 65/3.12 |
| 5,152,819 A | 10/1992 | Blackwell et al. ........... | 65/3.12 |
| 5,154,744 A | 10/1992 | Blackwell et al. ........... | 65/3.12 |
| 5,332,702 A | 7/1994 | Sempolinski et al. ....... | 501/106 |
| 5,395,413 A | 3/1995 | Sempolinski et al. ........ | 65/414 |
| 5,730,771 A | * 3/1998 | Terney et al. .............. | 65/60.52 |

FOREIGN PATENT DOCUMENTS

| | | | |
|---|---|---|---|
| EP | 0 038 900 | 11/1981 | ........... C01B/33/12 |
| EP | 0 092 024 | 10/1983 | ........... C01B/33/18 |
| EP | 0 103 448 | 3/1984 | ............. C03C/3/04 |
| EP | 0 146 659 | 7/1985 | ........... C03C/13/04 |
| EP | 0 471 139 | 2/1992 | ............. C03B/8/04 |
| GB | 2049641 | 12/1980 | ........... C01B/33/12 |
| WO | 90/10596 | 9/1990 | ........... C01B/33/18 |

OTHER PUBLICATIONS

W. Lee et al., Preparation and Characterization of Titanium (IV) Oxide Photocatalysts, 1992, Mat. Res. Bull., vol. 27, pp. 685–692.

* cited by examiner

*Primary Examiner*—James Derrington
(74) *Attorney, Agent, or Firm*—Edward F. Murphy

(57) ABSTRACT

This invention relates to production of high purity fused silica glass doped with titania using titanium chelates. Useful chelates include titanium acetylacetonate, and titanium ethyl acetoacetate among others.

17 Claims, 2 Drawing Sheets

Transmission Spectrum of TYZOR DC

US 6,487,879 B1

METHOD OF MAKING TITANIA-DOPED FUSED SILICA

This application claims the benefit of U.S. Provisional Application No. 60/040,048, filed Mar. 7, 1997, and Application No. PCT/US98/03656, filed Feb. 25, 1998, entitled METHOD OF MAKING TITANIA-DOPED FUSED SILICA, by Jeffrey L. Blackwell, David Dasher, A. Renee Sutton and Carlton M. Truesdale.

FIELD OF THE INVENTION

The invention relates generally to the manufacture of high purity metal oxide glass, and specifically to a method of doping high purity fused silica using organotitanium materials.

BACKGROUND OF THE INVENTION

Titania-doped silica glasses have found numerous use in the industry due to its low expansion properties as well as for its excellent resistance to fatigue. In addition, optical fiber having one or more outer layers doped with titania has been shown to exhibit superior strength, as compared to homogeneous silica clad fibers. Superior strength is desirable in optical fiber as it reduces the potential for rupture and consequential replacement.

Various methods and apparatus for the production of high purity metal oxides, and particularly fused silica, from a chloride-based feedstock have been well documented. Such equipment generally include a number of burner arrangements and feedstock delivery systems, all based on the oxidation of a metal chloride through flame hydrolysis or pyrolysis. Illustrative examples are, U.S. Pat. No. 4,491,604 (Lesk et al.) wherein trichlorosilane, dichlorosilane, and silicon tetrachloride are flame hydrolyzed to form soot, and U.S. Pat. No. 3,666,414 (Bayer) wherein silicon halides, such as silicon chloroform, are flame hydrolyzed. In similar processes, U.S. Pat. No. 3,486,913 (Zirngibl) and U.S. Pat. No. 2,269,059 (McLachlan) teach of oxidation of halides: inorganic halide components in vapor form such as $TiCl_4$, $CrCl_3$, $CrO_2Cl_2$, $SiCl_4$, $AlCl_3$, $ZrCl_4$, $FeCl_2$, $FeCl_3$, $ZnCl_2$, or $SnCl_4$ oxidized with air, steam, or oxygen are employed in '913; while silicon halides and $AlCl_3$, $TiCl_4$, and $ZrCl_4$ are employed in '059.

U.S. Pat. No. 2,326,059 (Nordberg) details a technique for making silica-rich, ultra-low expansion glass by vaporizing tetrachlorides of Si and Ti into the gas stream of an oxy-gas burner, depositing the resultant mixture to make a preform, vitrifying the preform at 1500° C. to make an opal glass, and firing the opal preform at a higher temperature to cause it to become transparent. Unlike the instant invention, the stated reference does not employ the use of halide-free, titanium-containing source compounds.

U.S. Pat. No. 4,501,602 (Miller et al.) describes the production of glass and glass/ceramic articles via a vapor phase oxidation process wherein β-diketonate complexes of metals selected from Groups IA, IB, IIA, IIB, IIIA, IIIB, IVA, IVB, and the rare earth series of the Periodic Table are vaporized, the vapor is transported to an oxidation site, such as a burner or a hot plasma zone which is adjacent to a deposition substrate or within a deposition tube, and oxidized in the vapor phase to form particulate metal oxide soot.

β-diketonate complexes are also available of metals in Group VA of the Periodic Table, notably tantalum and vanadium. Miller et al. did not refer to the halide-free, titanium-containing source compounds employed in the present invention.

Japanese Patent Application No. 90838-1985, entitled MANUFACTURING METHOD OF QUARTZ GLASS PREFORM FOR OPTICAL TRANSMISSION, (Okamoto et al.) discloses a method of doping quartz glass by utilizing an ester silane expressed by the general formula $R^1nSi(OR^2)_{4-n}$ and one or more dopants defined by the formulas $Ge(OR^3)_3$, $B(OR^3)_3$ and $PH_3$, where $R^1$ is a hydrogen atom, methyl or ethyl group; $R^2$ is a methyl or ethyl group; $R^3$ is an univalent hydrocarbon group; and n is an integer ranging between 0 and 4. A plethora or organometallic compounds are disclosed including methyltrimethoxysilane, dimethyldimethoxysilane, trimethylmethoxysilane, tetramethoxysilane, methyltriethoxysilane, and tetraethoxysilane, though none of the halide-free titania-containing source compounds of the instant invention are mentioned.

Recently, various methods have been suggested for the manufacture of titania-doped silica. For example, co-assigned, U.S. Pat. No. 5,067,975, disclosed a method of doping silica with titania using $SiCl_4$ and $TiCl_4$ for optical fiber applications. The resulting optical fiber includes a core, an inner cladding, and two outer claddings, one nominally about 8% by weight $TiO_2$ and a bump layer, with the bump layer having a $TiO_2$ concentration greater than 10.5 % by weight. The sole purpose of the bump layer being to control the loss of titania during consolidation.

More recently, co-assigned U.S. Pat. No. 5,154,744, disclosed a method of doping silica with titania which method eliminates the need for the bump layer without compromising the strength of the fiber. This patent discloses a method of making titania-doped silica glass having excellent fatigue resistance as well as excellent retention of titania after consolidation, by extracting titania from organometallic compounds selected from titanium tetra isopropoxide, titanium tetra ethoxide, titanium tetra 2-ethylhexyloxide, titanium tetra cyclopentyloxide, and titanium amides.

While the methods disclosed in the above patents have been found adequate for the production of titania-doped fused silica, there continues to be a need for more efficient methods of producing such products. In particular, there is an ongoing need for methods which can be used to produce titania-doped fused silica of improved physical properties.

SUMMARY OF THE INVENTION

Briefly, the invention relates to a method of making titania-doped fused silica using a group of organotitanium materials which are less sensitive to air and moisture, and which tend to decompose less than previously disclosed organotitanium materials.

In one aspect, the invention relates to a method of making a non-porous body of high purity fused silica glass doped with titania comprising the steps of:

(a) forming amorphous particles of high purity fused silica;

(b) doping said particles with titania in vapor form;

(c) depositing said titania-doped amorphous particles onto a support; and (d) either essentially simultaneously with said deposition or subsequent thereto consolidating said deposit of titania-doped amorphous particles into a non-porous body;

the improvement being that the titania is produced using titanium chelates as the titanium-containing compound. Preferred chelates include titanium acetylacetonate, titanium ethyl acetoacetate, and combinations of these.

It is a further object of the instant invention to provide a method of making titania-doped optical fiber having superior strength using as the titania source, the inventive group of organotitanium materials.

DETAILED DESCRIPTION OF THE INVENTION

Figure 1:
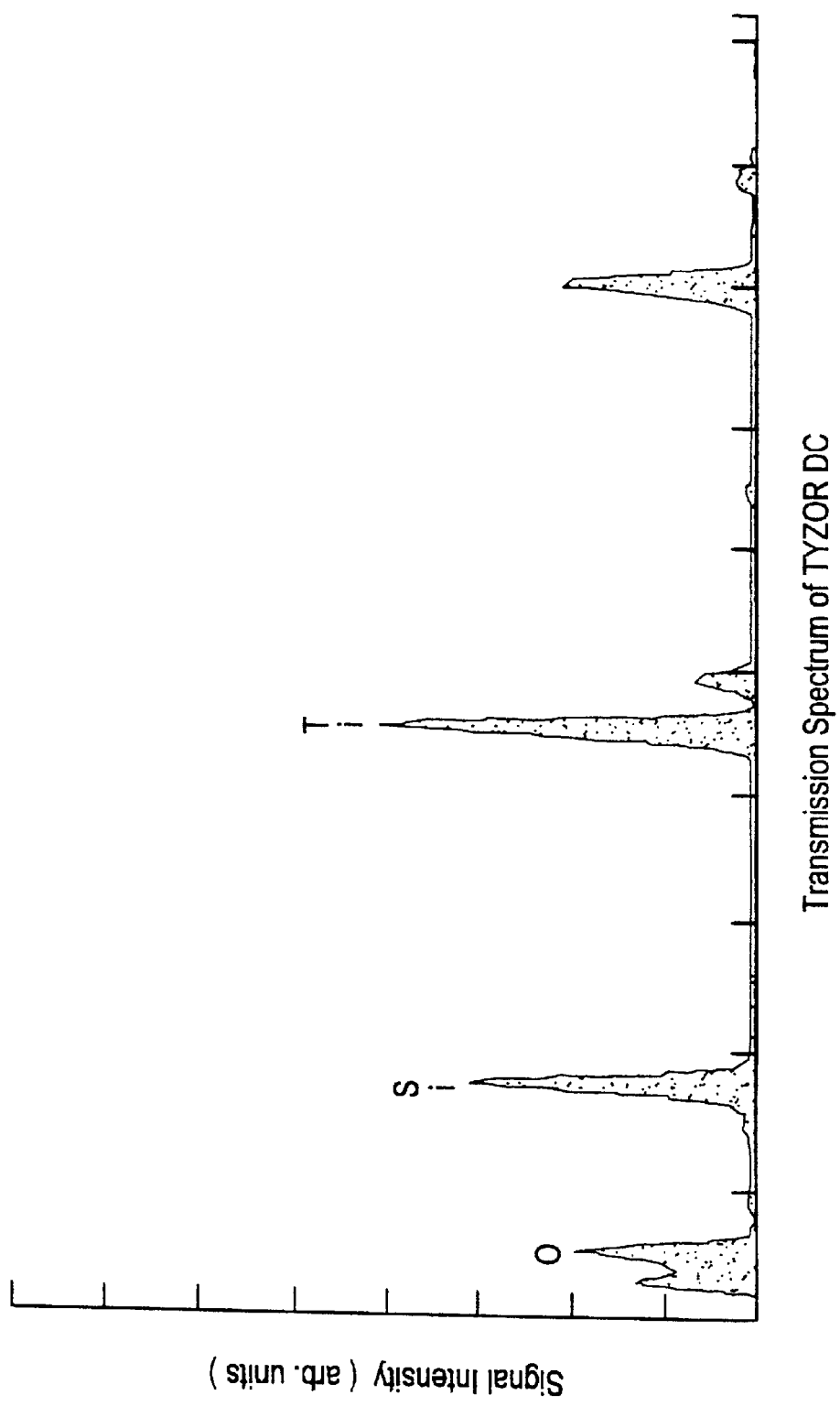
FIG. 1 is a scanning electron micrograph of the surface layer of a silica blank doped with titania using one of the inventive organotitanium materials.

Most of the processes which have been developed by industry for the manufacture of fused silica such as those used for stepper lens and optical waveguide applications employ the chemical vapor deposition (CVD) concept or a modified version thereof. In a typical CVD process, each of the component liquids (i.e., silica and titania precursor) is heated to a constant temperature at which enough vapor pressure is generated to produce a reasonable rate of deposition. The individual vapors are entrained in a carrier gas stream, mixed together prior to combustion to ensure homogeneous output, and then passed through a burner flame, usually a natural gas/oxygen mixture which frequently contains excess oxygen. The vapors in the mixture are converted to their respective oxides upon exiting the burner orifice to form a stream of volatile gases and finely-divided, amorphous, spherical aggregates, called soot. The soot is collected on a support, for example, on a mandrel (called outside vapor deposition), or on the surface of a bait tube (called axial vapor deposition), and deposited in thin layers of porous preform which is then subjected to high temperatures to consolidate the preform into a non-porous monolithic glassy body.

A two-step process has also been described for the production of doped fused silica. In the first stage, oxygen or nitrogen, the carrier gas, is bubbled through a liquid feedstock of titania and silica precursors. For example, the feedstock may contain titania precursors such as titanium tetra isopropoxide, titanium tetra ethoxide, titanium tetra 2-ethylhexyloxide, titanium tetra cyclopentyloxide, titanium amides and silica precursor such as octamethylcyclotetrasiloxane (OMCTS), maintained at a constant temperature. In one useful embodiment, two feedstock of titania and silica precursors are heated to temperatures in the range of 100–170° C. to generate vaporous reactants. The resulting vaporous reactant are transported to a reaction site, such as a burner, via the carrier gas, wherein the vaporous gas streams are combusted in a burner flame fueled with natural gas and oxygen. The presence of oxygen serves to convert the vaporous reactants to their respective oxides upon exiting the burner orifice to form a stream of volatile gases and finely-divided, spherical particles of soot that are deposited onto a substrate, forming a porous blank, or preform, of opaque, white silica soot. In the second stage, the blank, or preform, is heat treated in a helium/chlorine atmosphere to full consolidation. For optical fiber production, there is a third and final stage in which conventional fiber-draw technology is utilized to pull optical waveguide fiber from the consolidated preform.

In one particularly useful process to which the present invention can be adapted, two raw materials, titania and silica precursers, are separately delivered to a furnace via two tanks. The tanks are maintained at appropriate temperatures to vaporize the raw materials. The vapors are then carried to an udder where they are mixed and burned with oxygen to produce silicon and titania dioxides. In one example, the vapors are carried from the tanks to the udder by flowing a nitrogen gas through the tanks at flow rates appropriate for a given operation. 1 The size of the tanks, as well as the temperature of the raw materials tanks can also vary depending on the vaporization particular raw materials and the desired level of production.

The present method can also be adapted to other fused silica manufacturing processes such as described in U.S. Pat. Nos. 5,043,002, herein incorporated by reference. The inventive process can also be adapted to known methods of producing high purity fused silica by flame pyrolysis or hydrolysis, such as those disclosed in the early patents by Nordberg (U.S. Pat. No. 2,239,551) in 1941 and Hyde (U.S. Pat. No. 2,272,342) in 1942.

It has been observed that during consolidation of porous preforms of silica, the chlorine in the consolidation atmosphere may remove OH from the glass thereby limiting the optical transmission of the resulting glass. Therefore, such compounds must be compatible with the organosilicon compound. By "compatible" it is meant that such organotitanium compound must not self-polymerize or polymerize with the organometallic precursors of silica. In addition to ease of production of titania soot, it is also important that the organotitanium compound exhibit both thermal and moisture stability.

We have found that particularly in the two-step process described above, conventional organotitanium precursors such as titanium tetra isopropoxide and other similar precursors are sensitive to air and moisture and tend to decompose with prolonged exposure to high temperatures typical of such processes. Thus, in applications utilizing such material, it is generally necessary to keep moisture away from the material, for example, by placing the material in an environment having a positive nitrogen pressure in order to prevent the accumulation of water vapor in the air. In addition, titanium tetra isopropoxide tends to hydrolyze in the presence of water making it inefficient as a source of titania.

We have also found that while conventional organotitanium materials such as titanium (tetra) isopropoxide may be useful in processes where the production of the silica and titania gas streams employ a vaporizer, these conventional titania precursors are not as efficient in processes which do not employ vaporizers. This is particularly true in processes which utilize bubblers because in such processes the precursors are subjected to high temperatures for extended periods of time. Such extended high temperature exposure in some cases leads to decolorization and/or decomposition of the precursor and may result in such quality problems as seeds and inclusions being formed in the glass. Other problems which may result includes clogging up of the apparatus which then lead to costly clean ups and high manufacturing cost. Most significantly, conventional organotitanium materials yield low titania soot deposits. In contrast, we have found that the above problems are significantly reduced if not eliminated by the use of the organotitanium materials described below.

We have discovered a group of organotitanium materials, titanium chelates, which are compatible with OMCTS, less sensitive to air and moisture, and which tend to decompose less than titanium isopropoxide. By compatible, we mean that the titanium chelate does not polymerize itself or with the silica precursor as polymerization leads to a decrease in the vapor pressure, and in the absence of vaporization the result is a decrease in the amount of titania soot collected. Any titanium chelate which is compatible with the silicon precursor, is relatively insensitive to both air and moisture, and which will not prematurely decompose or polymerize, may be used in the present method. Conventional organotitanium materials such as titanium isopropoxide have a tendency to prematurely breakdown (decompose) before the end of the processing period (less than 7 days and in some cases, less than 4 days). The ideal processing time is about 6 to 7 days, preferably, 160 hours. We have found that the inventive chelate materials are able to withstand the operating temperatures for prolonged periods fo time and as such do not show the premature decompositions observed in conventional alkoxide materials. Preferred titanium chelates are those having a boiling point of 250° C. or less. We have found one class of titanium chelates, the amines, and in particular titanium diethanolamine to be incompatible with siloxanes, in particular, OMCTS. Other titanium chelates which are not useful for the present invention include titanium di(dioctylpyrophosphate) oxyacetate, titanium di(butyl, octylpyrophosphate) di(dioctyl, hydrogen phosphite) oxyacetate. These compounds exhibit low volatility and are unacceptable because they are likely to introduce phosphorous into the glass. Another compound which is not particularly preferred is titanium tetra actate, a low volatility solid.

Examples of useful titanium chelates include, titanium acetyloacetonates, and titanium ethyl acetoacetates in particular bis(ethylacetoacetato) diisopropoxy titanate (TYZOR® DC) and acetylacetonate titanate chelate (TYZOR® GBA) both available from DuPont, Wilmington, Del. In addition to being compatible with OMCTS, these chelates are also generally miscible with the silica precursors.

EXAMPLES

In the following examples, we demonstrate the production of titania soot using the inventive titanium precursors. Two preferred titanium chelates, titanium acetylacetonate (GBA), and titanium ethyl acetoacetate (DC) were used to produce titania soot using a chemical vapor deposition (CVD) method under the following conditions:

| | |
|---|---|
| Premix $CH_4$ (lpm) | 4.0 |
| Premix $O_2$ (lpm) | 3.6 |
| Inner shield $O_2$ (lpm) | 2.0 |
| Outer shield $O_2$ (lpm) | 6.3 |
| Carrier $N_2$ (lpm) | 2.5 |
| Vaporizer Temp. (° C.) | 230 |
| Vaporizer fume Temp. (° C.) | 215 |
| Delivery Rate (g.min) | 2.0 |

For comparison, a third precursor, titanium diethanolamine—(TYZOR® DEA) was used under the above conditions except that lower vaporizer and fume temperatures were used, namely, 120 and 100° C. respectively. At this condition no titania soot was observed or collected on the slide. The vaporizer temperature was raised to 230° C. and at this temperature, only very little amount of soot was collected on a slide.

Figure 2:
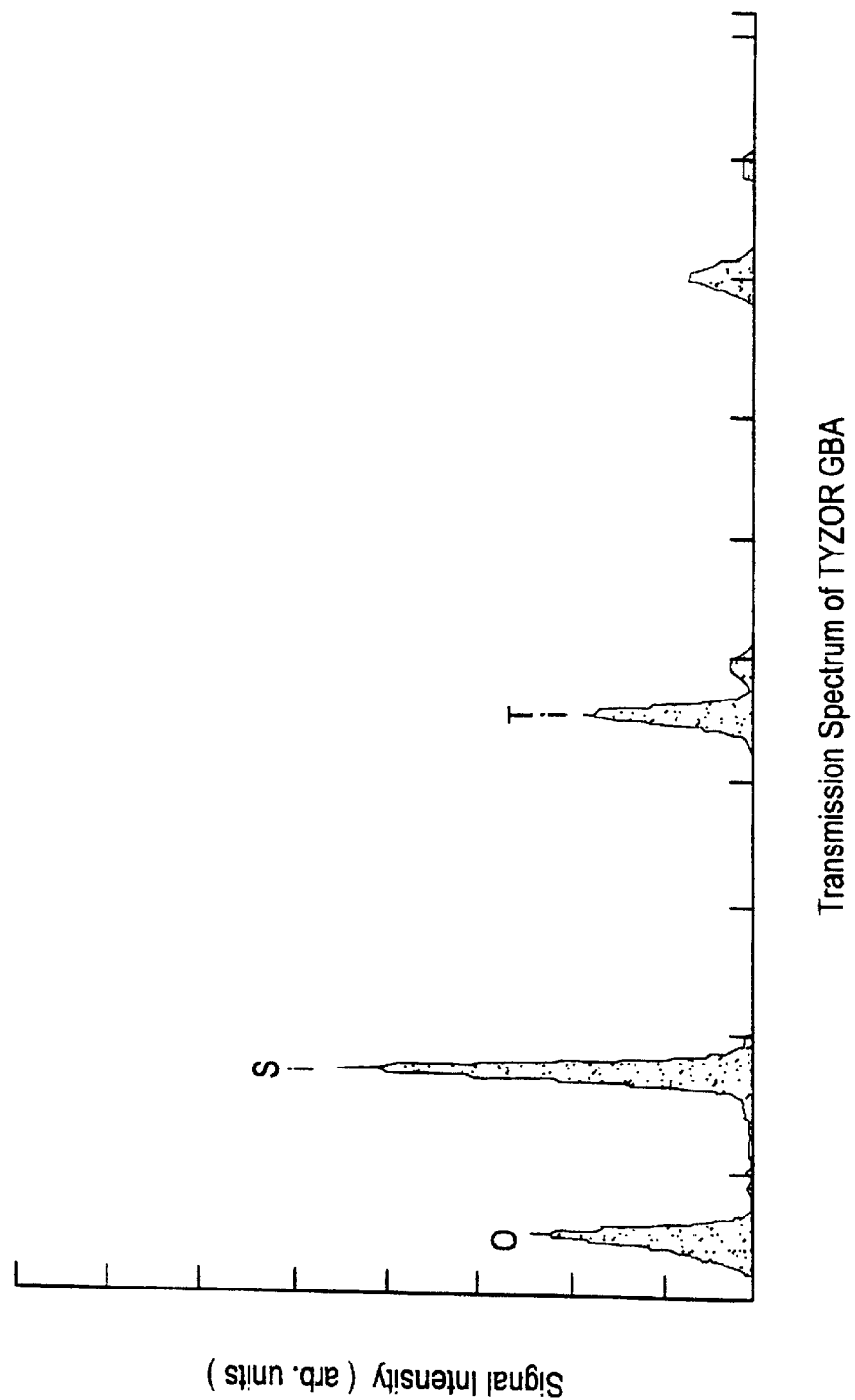
FIG. 2 is a scanning electron micrograph of the surface layer of silica blank doped with titania using another inventive organotitanium material.

The results from the DC and GBA precursors are shown in FIGS. 1 and 2, and as Examples 1 and 2 respectively in the following table. Titanium tetra isopropoxide (Ti-POX) precursor is shown for comparison (C-1).

| Example | Precursor | Boiling Point (° C.) | Viscosity (cPoise) | (¹) (% Ti) | Performance |
|---|---|---|---|---|---|
| C-1 | Ti-POX | 232 | 3 | 17 | Hydrolyzes Compatible |
| 1 | GBA | 70 | 6 | 10 | Stable, Moisture and air insensitive, some phase separation |
| 2 | DC | 220 | 37 | 11 | Very stable, air and moisture insensitive, compatible |

(¹) Concentration of titanium in the organotitanium precursor.

As shown, the titanium chelates produced titania soot which exhibited very good physical and performance properties. An analysis of the soot using transmission microscopy showed that these organotitanium compounds produced acceptably high performance (measured by the intensity of $TiO_2$ to $SiO_2$.) These results are shown in FIGS. 1 and 2.

Example 2, using DC represents the most preferred embodiment of the invention both in terms of stability and soot production.

What is claimed is:

1. In a method for making a body of high purity fused silica glass doped with titania comprising the steps of:
   (a) forming amorphous particles of high purity fused silica from silica precursor;
   (b) doping said particles with titania in vapor form; and
   (c) depositing said titania-doped amorphous particles onto a support; the improvement being that said titania is produced from a high volatility titanium ethyl acetoacetate characterized by being compatible with said silica precursor, is insensitve to air and moisture, and does not prematurely decompose or polymerize.

2. The method of claim 1 wherein said high volatility titanium ethyl acetoacetate is bis(ethylacetoacetate) diisopropoxy titanate.

3. The method according to claim 1, further comprising the step of either essentially simultaneously with said deposition or subsequent thereto consolidating said deposit of titania-doped amorphous particles into a non-porous body.

4. The method according to claim 3, wherein said titania-doped amorphous particles are characterized by having submicroscopic crystals of rutile and anatase with rutile being the predominant crystal phase.

5. The method according to claim 1, wherein said high volatility titanium ethyl acetoacetate is halide-free.

6. The method of claim 3, wherein the non-porous body is an optical fiber.

7. The method of claim 5, wherein the support is selected from the group consisting of a mandrel and a bait tube.

8. The method of claim 3, further comprising the step of drawing the consolidated non-porous body to form a waveguide fiber.

9. A method of making titanium-doped fused silica glass, said method comprising:
   providing a titanium ethyl acetoacetate;
   providing an organosilicon silica precursor;
   delivering said titanium ethyl acetoacetate and said organosilicon silica precursor to a reaction site where said titanium ethyl acetoacetate and said organosilicon silica precursor are converted into a stream of titania-doped silica soot; and wherein exposure of said titanium ethyl acetoacetate to air and moisture is not inhibited.

10. A method as claimed in claim 9 wherein delivering said titanium ethyl acetoacetate and said organosilicon silica precursor to said reaction site comprises bubbling a carrier gas through said titanium ethyl acetoacetate.

11. A method as claimed in claim 9 wherein said titanium ethyl acetoacetate and said organosilicon silica precursor are heated to temperatures in the range from 100–170° C.

12. A method as claimed in claim 9 wherein providing a titanium ethyl acetoacetate further comprises providing a titanium ethyl acetoacetate that does not polymerize with said provided organosilicon silica precursor.

13. A method as claimed in claim 9 wherein providing a titanium ethyl acetoacetate further comprises providing a titanium ethyl acetoacetate that is resistant to decomposition when exposed to silica glass manufacturing temperatures.

14. A method as claimed in claim 9 wherein providing a titanium ethyl acetoacetate further comprises providing a bis(ethylacetoacetate) diisopropoxy titanate.

15. A method as claimed in claim 9 wherein providing said organosilicon silica precursor further comprises providing a siloxane.

16. A method as claimed in claim 9 wherein providing said organosilicon silica precursor further comprises providing a cyclic siloxane.

17. A method as claimed in claim 9 wherein providing said organosilicon silica precursor further comprises providing octamethylcyclotetrasiloxane.

* * * * *